US010997193B2

(12) United States Patent
Balasubramanyan et al.

(10) Patent No.: US 10,997,193 B2
(45) Date of Patent: *May 4, 2021

(54) MANAGING QUERIES IN BUSINESS INTELLIGENCE PLATFORMS

(71) Applicant: International Business Machines Corporation, Armonk, NY (US)

(72) Inventors: Arun Balasubramanyan, Chennai (IN); Yuntao Liu, Centennial, CO (US); Pamela K. Prinz, Longmont, CO (US); Mary E. Rudden, Denver, CO (US); John A. Tobasco, Kentwood, MI (US)

(73) Assignee: International Business Machines Corporation, Armonk, NY (US)

( * ) Notice: Subject to any disclaimer, the term of this patent is extended or adjusted under 35 U.S.C. 154(b) by 537 days.

This patent is subject to a terminal disclaimer.

(21) Appl. No.: 15/846,407

(22) Filed: Dec. 19, 2017

(65) Prior Publication Data

US 2018/0107722 A1 Apr. 19, 2018

Related U.S. Application Data

(63) Continuation of application No. 14/283,641, filed on May 21, 2014.

(51) Int. Cl.
*G06F 16/25* (2019.01)
(52) U.S. Cl.
CPC ................... *G06F 16/254* (2019.01)
(58) Field of Classification Search
CPC ..................................................... G06F 16/254

(Continued)

(56) References Cited

U.S. PATENT DOCUMENTS

2006/0253472 A1* 11/2006 Wasserman ............ G06Q 10/06
2007/0021992 A1* 1/2007 Konakalla .............. G06Q 10/04
705/7.28

(Continued)

FOREIGN PATENT DOCUMENTS

WO 2013070873 5/2013

OTHER PUBLICATIONS

Kooijimans, Alex et al., "Using IBM System z as Hub for Business Analytics", IBM Redbooks, publication by IBM Systems and Technology Group, 2013 (7 pages).

(Continued)

*Primary Examiner* — Joshua Bullock
(74) *Attorney, Agent, or Firm* — Schmeiser, Olsen & Watts, LLP; Michael A. Petrocelli

(57) ABSTRACT

A method and system for managing queries in business intelligence platforms. It is determined that at least one requirement to complete a first query exceeds a threshold and in response, a redacted report failing to exceed the threshold is generated. The first query requests data from at least one business intelligence content from a first geographical region. In response to detecting a rejection, by a user, of the redacted report after the user had been prompted, to accept or reject the redacted report: (i) the first query is converted to a second query configured to be used by an Extract, Transform, and Load (ETL) program from a second geographical region; and (ii) a report responsive to the first query is generated.

20 Claims, 7 Drawing Sheets

(58) Field of Classification Search
USPC .......................................................... 707/602
See application file for complete search history.

(56) References Cited

U.S. PATENT DOCUMENTS

| | | | |
|---|---|---|---|
| 2007/0203893 A1* | 8/2007 | Krinsky | G06F 16/33 |
| 2009/0240663 A1* | 9/2009 | Plattner | G06F 16/2455 |
| 2013/0097114 A1* | 4/2013 | Burke | G06F 16/90348 |
| | | | 707/602 |
| 2015/0339358 A1 | 11/2015 | Balasubramanyan et al. | |

OTHER PUBLICATIONS

Anavi-Chaput, Viviane et al., "Business Intelligence Architecture on S/390 Presentation Guide", Business Intelligence Architecture on S/390 Presentation Guide, Jul. 2000 (202 pages).

Xiuzhen, Feng et al., "Online Slicing Analysis in Adverse Drug Reaction Data Warehouse", 2012 15th International Conference on Network-Based Information Systems, pp. 412-416.

Gang, Tong et al., "The Research & Application of Business Intelligence System in Retail Industry", Proceedings of the IEEE International Conference of Automation and Logistics, Qingdao, China, Sep. 2008, pp. 87-91.

Office Action dated (Mar. 31, 2017) Application No. END920140008US1; U.S. Appl. No. 14/283,641, filed May 21, 2014.

Amendment dated (Jun. 28, 2017) Application No. END920140008US1; U.S. Appl. No. 14/283,641, filed May 21, 2014.

Notice of Allowance dated (Oct. 3, 2017) Application No. END920140008US1; U.S. Appl. No. 14/283,641, filed May 21, 2014.

* cited by examiner

MANAGING QUERIES IN BUSINESS INTELLIGENCE PLATFORMS

This application is a continuation application claiming priority to Ser. No. 14/283,641, filed May 21, 2014, now U.S. Pat. No. 9,892,179, issued Feb. 13, 2018.

FIELD OF THE INVENTION

The present invention relates generally to data analytics. More particularly, the present invention relates to a method, system, and computer program product for managing queries that request data from at least one business intelligence content.

BACKGROUND OF THE INVENTION

The Information Age represents an economy based on information computerization. The ever-increasing data constantly pressure organizations to organize, understand, and react quickly. Equipped with a capable and efficient business intelligence ("BI") solution, enterprises of all sizes to cost can effectively manage and analyze the massive volume, variety, and velocity of data that consumers and businesses create every day. As activities in our world become more integrated, however, the rate of data growth is increasing exponentially. This data explosion is rendering commonly accepted practices of data management to be inadequate. As a result, this growth has given birth to a new wave of business challenges around data management and analytics.

SUMMARY OF THE INVENTION

A first aspect of the present invention provides a method of managing queries in business intelligence platforms. The method includes receiving, by a processor, a first query requesting data from at least one business intelligence content, the first query having a first format. The method further includes determining, by the processor, at least one requirement to complete the first query. The method further includes converting, by the processor, the first query to a second query configured to be used by an Extract, Transform, and Load (ETL) program, in response to determining that the at least one requirement exceeds a threshold, the second query having a second format.

A second aspect of the present invention provides a computer program product for managing queries in business intelligence platforms. The computer program product includes one or more computer readable storage medium and program instructions stored on the one or more computer readable storage medium. The computer program product further includes program instructions to receive a first query to retrieve data from at least one business intelligence content, the first query having a first format. The computer program product further includes program instructions to determine at least one requirement to complete the first query. The computer program product further includes program instructions to convert the first query to a second query configured to be used by an ETL program in response to determining that the at least one requirement exceeds a threshold, the second query having a second format.

A third aspect of the present invention provides a computer system for managing queries in business intelligence platforms. The computer system includes one or more computer processors and one or more computer readable storage medium. The computer system further includes program instructions stored on the computer readable storage medium for execution by at least one of the one or more processors. The computer system further includes program instructions to receive a first query to retrieve data from at least one business intelligence content, the first query having a first format. The computer system further includes program instructions to determine at least one requirement to complete the first query. The computer system further includes program instructions to convert the first query to a second query configured to be used by an ETL program in response to determining that the at least one requirement exceeds a threshold, the second query having a second format.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Overview

Figure 1:
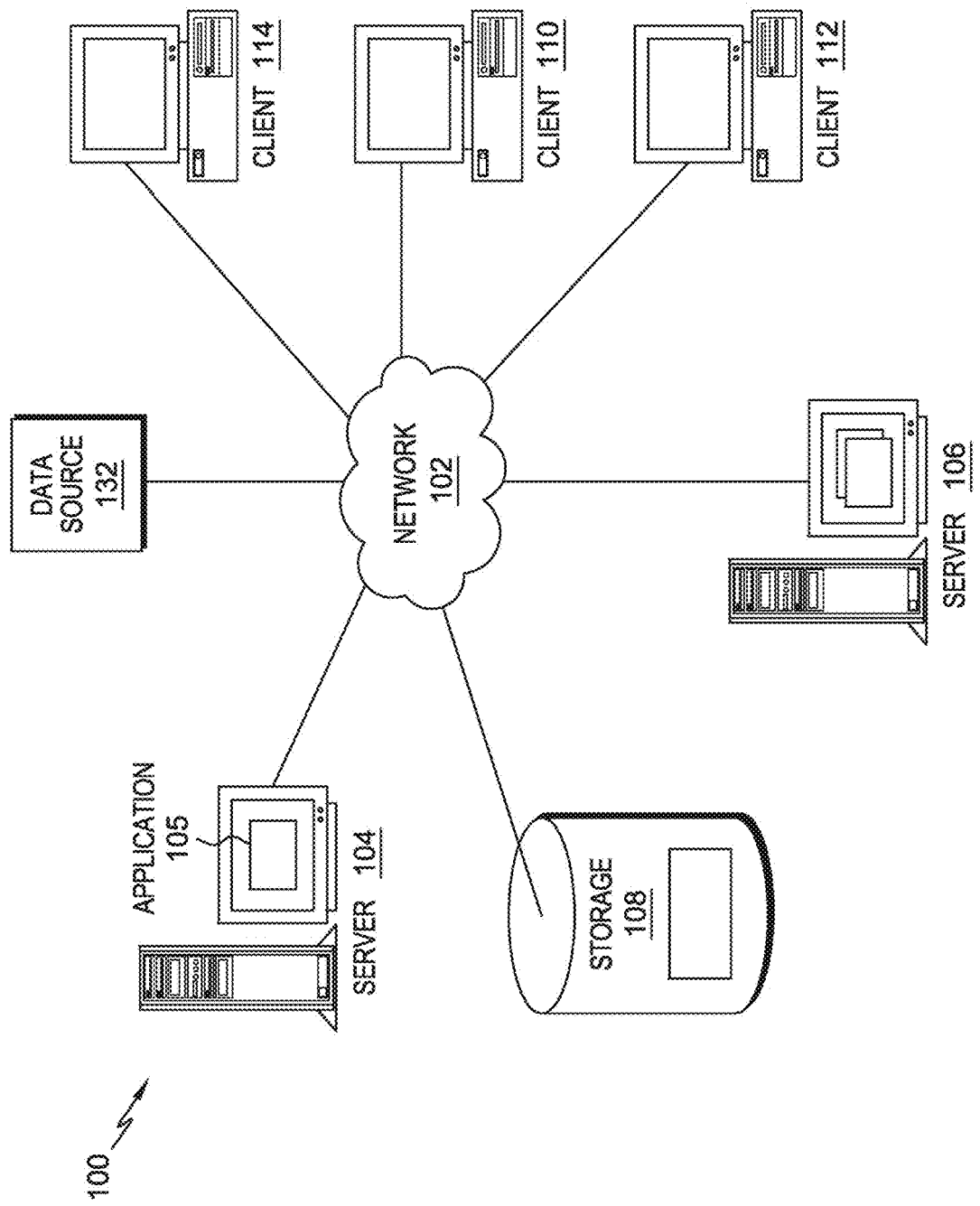
FIG. 1 depicts a pictorial representation of a network of data processing systems in which illustrative embodiments may be implemented.

Embodiments of the present invention enhance web-based BI tools in processing report requests. Depending on the amount of data required to process the report requests, one embodiment may use conventional web reporting capabilities or may transform the request to be processed by Extract-Transform-Load ("ETL") tools. In particular, embodiments of the present invention may create data feeds in specific formats to be compatible with the ETL tools. Another embodiment of the present invention converts the ETL queries into metadata consumable in Hive/Hbase format, namely, a query-able data set for the Big Data platforms. Embodiments of the present invention may convert ad hoc, transient, report requests requiring retrieval of large amount of data into persistent data sets to be used Big Data platform.

In one embodiment, a report managing program may receive a request that would require a size of data to be processed, where the request can be specified to be executed as data feed or as operational metadata. By comparing the size of data required to complete the request with a predetermined threshold, the embodiment of the present invention may convert the request into data feeds. The ETL tool retrieves the data by using these data feeds, e.g. creating and executing an SQL query corresponding to the ETL queries. In one embodiment, the ETL tool may create a flat file in the requested format.

One embodiment provides output from the ETL tool to a Big Data platform, such as IBM Infosphere Big insights®. In this embodiment, Big Data platform's storage layer may use distributed file systems such as General Parallel File System ("GPFS") to store the ETL queries. Thus, embodiments of the present invention set up metadata in Big Data platform to convert the ETL queries into a consumable and query-able data set and provide redundancy and scalable infrastructure for further analysis.

Using known techniques, web-based BI tools will struggle in processing requests requiring large volume of data. With large volume of data, it is more often than not that complex data and numerous data elements are involved. Because web-based BI tools typically require executing the query to obtain the data across networks then formatting the data according to the user's request in the web, the processing time could take a very long time to complete. At worst, BI tools will generate server timeouts and fail. In most cases, BI tools provide inconsistent performance in processing large volume data and cause network traffic issues, because the large volume of data rely on varying network speeds and need to be constantly transmitted over a network. In addition, reports generated from web-based BI tools may not be optimal for viewing via web, and any operations such as download to user's machine will be time consuming. At least one of these unique challenges is overcome by one or more embodiments of the present invention.

The illustrative embodiments are described with respect to certain data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

System for Managing Queries in Business Intelligence Platforms

Figure 2:
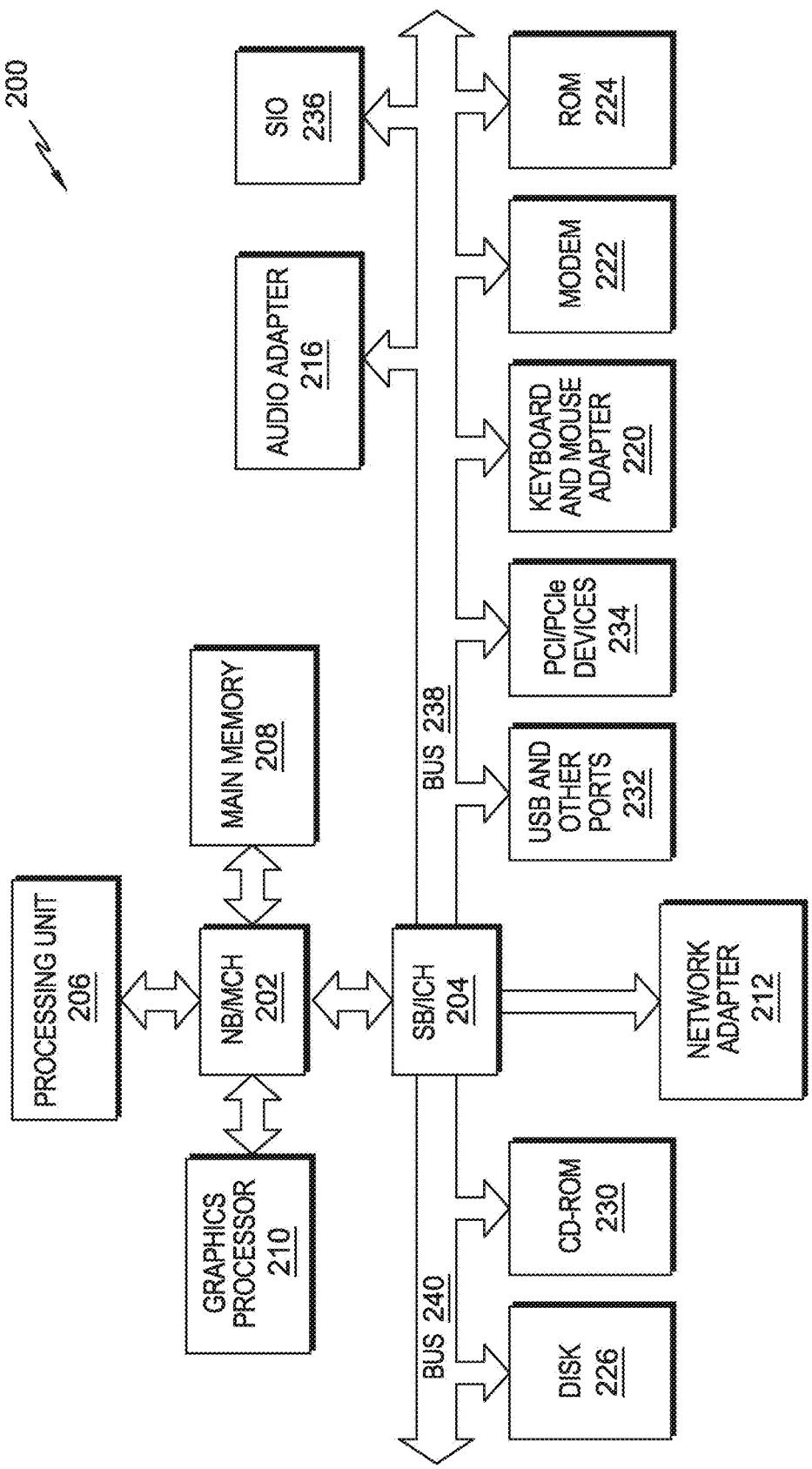
FIG. 2 depicts a block diagram of a data processing system in which illustrative embodiments may be implemented.

With reference to the figures and in particular with reference to FIGS. 1 and 2, these FIGS. are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104, or client 110, 112, or 114, may contain data and may have software applications or software tools executing thereon. Server 104 may include internal and external hardware components, as depicted and described in further detail with respect to FIG. 2.

Only as an example, and without implying any limitation to such architecture, FIG. 1 depicts certain components that are usable in an example implementation of an embodiment. For example, application 105 in server 104 implements an embodiment described herein. Application 105 is a query management program that manages queries in business intelligence platforms according to an embodiment herein. In one embodiment, query management program 302 receives a query requesting data from at least one business intelligence content and determines the requirements to complete the query. Query management program extracts requirements to successfully process the query and determines whether the requirements exceeds a predetermined threshold value. If so, query management program converts the query to an ETL query configured to be processed by an Extract, Transform, and Load ("ETL") program, which converts the ETL query to a format compatible with big data platforms.

Servers 104 and 106, storage unit 108, and clients 110, 112, and 114 may couple to network 102 using wired connections, wireless communication protocols, or other suitable data connectivity. Clients 110, 112, and 114 may be, for example, a personal computer, a laptop, a workstation, a mainframe, a mini-computer, or any other type of computing unit.

In the depicted example, server 104 may provide data, such as boot files, operating system images, files related to the operating system and other software applications, and applications to clients 110, 112, and 114. Clients 110, 112, and 114 may be clients to server 104 in this example. Clients 110, 112, 114, or some combination thereof, may include their own data, boot files, operating system images, files related to the operating system and other software applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a ide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this FIG. depicts a block diagram of a data processing system in which illustrative embodiments may be implemented. Data processing system 200 is an example of a computer, such as server 104 or client 110, 112, or 114 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. A computer readable or usable storage device does not include propagation media. Hard disk drive 226, CD-ROM 230, and other similarly usable devices are some examples of computer usable storage devices including a computer sable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java® programming system, may run in conjunction with the operating system and provides calls to the operating system from Java® programs or applications executing on data processing system 200 (Java and all Java-based trademarks and logos are trademarks or registered trademarks of Oracle Corporation and/or its affiliates).

Instructions for the operating system, the object-oriented programming system, and applications or programs are located on at least one of one or more storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
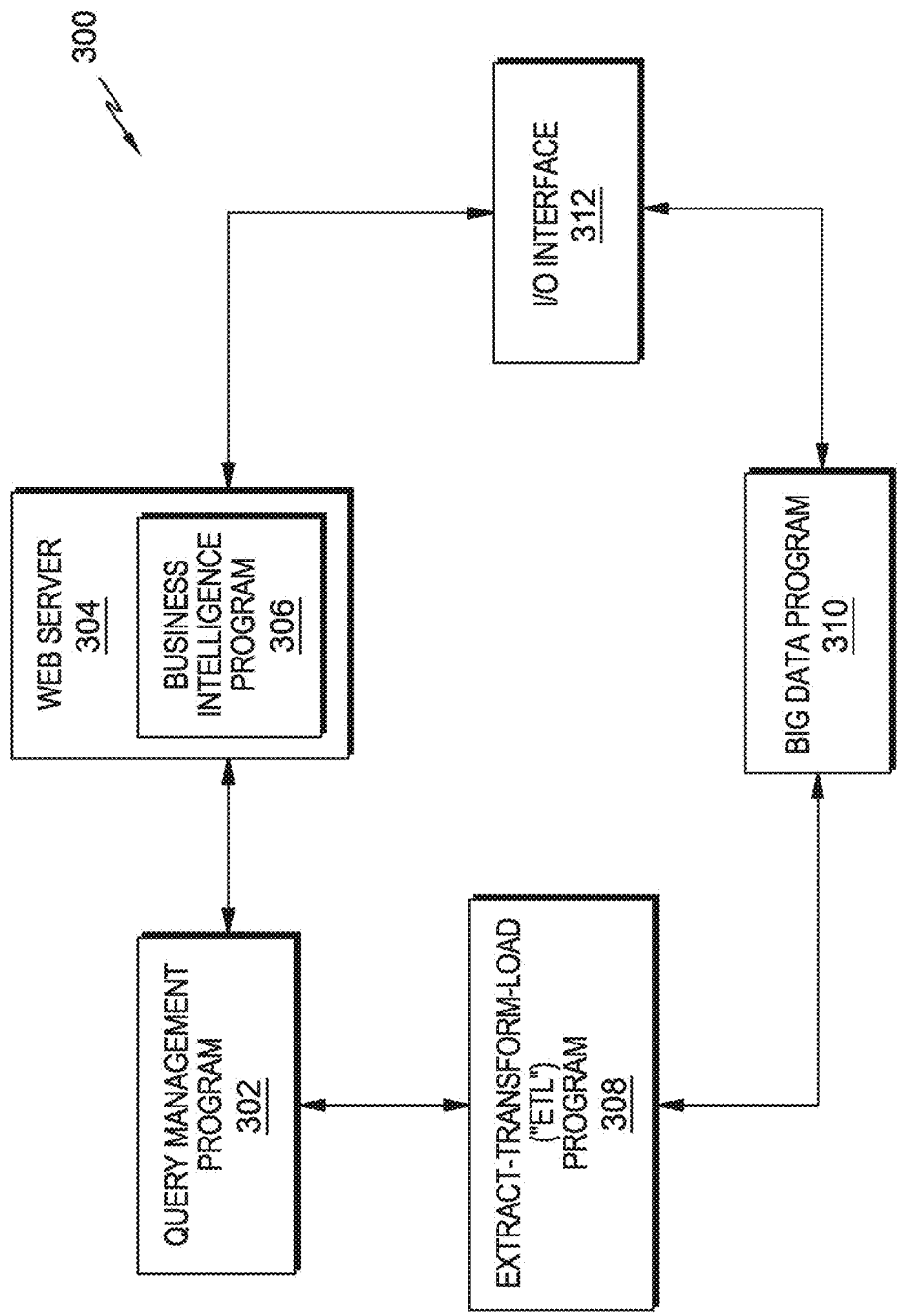
FIG. 3 depicts a block diagram of a system for managing business intelligence queries in accordance with embodiments of the present invention.

FIG. 3 is a block diagram of a system for managing business intelligence queries in accordance with embodiments of the present invention. With reference also to FIG. 3, a query management environment, indicated generally at 300, is an example of data processing environment 100 (see FIG. 1) in which illustrative embodiments may be implemented. Query management environment 300 offers features and capabilities for producing a product, such as a computer program, website, or publication. Query management environment may include communications network, which may be an example of network 102 (see FIG. 1); one or more workstations, which may be examples of a client 110, 112, 114 (see FIG. 1); and at least one server, which may be an example of a server 104 (see FIG. 1) and which may host or have access to storage.

Query management program 302 manages queries in business intelligence platforms. In one embodiment, query management program 302 receives a query requesting data originating from at least one business intelligence platform and determines the requirements to complete the query. Query management program 302 extracts requirements to successfully process the query and determines whether the requirements exceeds a predetermined threshold value. In one embodiment, query management program 302 receives a plurality of queries all of which are issued from different workstations, e.g. clients 110, 112, and 114 (see FIG. 1). In one embodiment, query management program 302 restricts at least one range from the query. More specifically, query management program 302 identifies queries that exceed the restricted range and issues an error. In another embodiment, query management program 302, upon identifying queries that that exceed the restricted range, provides query results based on a range that does not exceed the restricted range. In either embodiments, query management program 302 provides an option to proceed with extracting requirements to successfully process the query, where the processing may occur in big data program 310. In one embodiment, query management program 302 converts the query to an ETL query configured to be used by an Extract, Transform, and Load (ETL) program, which converts the ETL query to a format compatible with big data platforms.

Web server 304 is an example of servers 104 and 106 (see FIG. 1) in which illustrative embodiments may be implemented. As described in FIG. 1, web server 304 may couple to a network, which may be an example of network 102 (see FIG. 1), using wired connections, wireless communication protocols, or other suitable data connectivity. Web server 304 includes business intelligence program 306, which provides reports, analysis, dashboards, and scoreboards displaying business performance and recommends business decisions over a network, e.g. network 102 (see FIG. 1). In one embodiment, business intelligence program 306 allows users to explore information, analyze key facts, and quickly collaborate to align decisions with key stakeholders. In one embodiment, business intelligence program 306 includes at least the following features:

reports to equip users with the information they need to make fact-based decisions;

dashboards to help users access, interact, and personalize content in a way that supports how they make decisions;

analysis capabilities to provide access to information from multiple angles and perspectives so users can make informed decisions;

collaboration capabilities to include communication tools and social networking to fuel the exchange of ideas during the decision-making process; and score-carding capabilities to automate the capture, management, and monitoring of business metrics so users can compare them with a business's strategic and operational objectives.

Extract-Transform-Load ("ETL") program 308 integrates data across multiple systems using a parallel framework and supports extended metadata management and enterprise connectivity. ETL program 308 integrates all types of data, including big data at rest (Hadoop-based) or in motion (stream-based), on distributed and mainframe platforms. In one embodiment, ETL program 308 performs at least the following:

supports the collection, integration, and transformation of large volumes of data, with data structures ranging from simple to complex;

enables users to directly access big data on a distributed file system provides real-time data integration, as well as connectivity between data sources and applications;

optimizes hardware utilization and prioritize mission-critical tasks;

builds, deploys, updates, and manages data integration infrastructure; and supports data load optimization and balanced optimization for database systems.

ETL program 308 performs three main functions: extract, transform, and load. Extraction function available in ETL program 308 acquires data (in whatever format might be possible) from source systems. In one embodiment, ETL program 308 dumps a flat file from a database or spreadsheet, or sets up relationships with external systems that then supervise the transportation of data to the target system.

Transformation function available in ETL program 308 converts data formats. In one embodiment, data from source systems may include incompatible or incorrect information. Part of the transformation function is to "cleanse" or "reject" the data that does not conform. Common techniques used as part of this function include character examination (reject numeric values that contain characters) and range checking (reject values outside of an acceptable range). In one embodiment, ETL program 308 deposits rejected records in a separate file and transfer the rejected records to another tool for corrections. In an alternate embodiment, ETL program 308 displays to the users the rejected records for manual corrections. In both embodiments, the corrected values are then rolled into the transformed set.

Load function available in ETL program 308 deposits captured and transformed data into the new data store (warehouse, mart, etc.). For DB2® Universal Database ("UDB"), ETL program 308 SQL commands (IMPORT), utilities (LOAD), or integrated tools (Data Warehouse Manager and Information Integrator). In one embodiment, ETL program 308 transfers data from one table to another on the same system. In another embodiment, ETL program 308 receives data from a first system from a first geographical region and rearranges and reformats the data to be compatible with a different system from a different geographical region.

Big data program 310 manages and analyzes large volume, variety and velocity of data that are being generated. Big data program 310 increases operational efficiency by augmenting data warehouse environment. In one embodiment, big data program 310 is used as a query-able archive, allowing a user to store and analyze large volumes of multi-structured data without straining a data warehouse. In another embodiment, big data program 310 is used as a pre-processing hub, for user to explore data, determine a subset of data that user finds valuable, and extract the subset of data. In one embodiment, big data program 310 includes ad hoc analysis, thus allowing the user to perform analysis on all of the data. In one embodiment, big data program 310 performs at least the following:

analyzes structured or unstructured text data by accessing a library of extractors in a database;

ingests and processes social media data, to provide assistance in developing programs/applications such as customer retention, customer acquisition, lead generation, brand management, and campaign effectiveness;

ingests and processes large volumes of machine data sources, including IT machines, sensors, meters, GPS devices, and etc.; and integrates with framework architectures that stores and processes large-scale data-sets on clusters of commodity hardware.

I/O interface 312 is a component of data processing system 200 (see FIG. 2) in which illustrative embodiments may be implemented. I/O interface 312 includes any system for exchanging information to or from an external source. I/O interface 312 include any known type of external device, including a display device (e.g., monitor), keyboard, mouse, printer, speakers, handheld device facsimile, etc. I/O interface 312 is coupled to a bus, e.g., bus 238 (see FIG. 2), which provides a communication link between each of the components included in I/O interface 312, and may include any type of transmission link, including electrical, optical, wireless, etc.

I/O interface 312 also allows data processing system 200 (see FIG. 2) to store information (e.g., data or program instructions) on and retrieve the information from computer on at least one of one or more storage devices, such as hard disk drive 226 (see FIG. 2).

The functionality of the components in FIG. 3 is described in more detail in the discussion of FIGS. 4 to 8, which are presented below.

Process for Managing Queries In Business Intelligence Platforms

Figure 4:
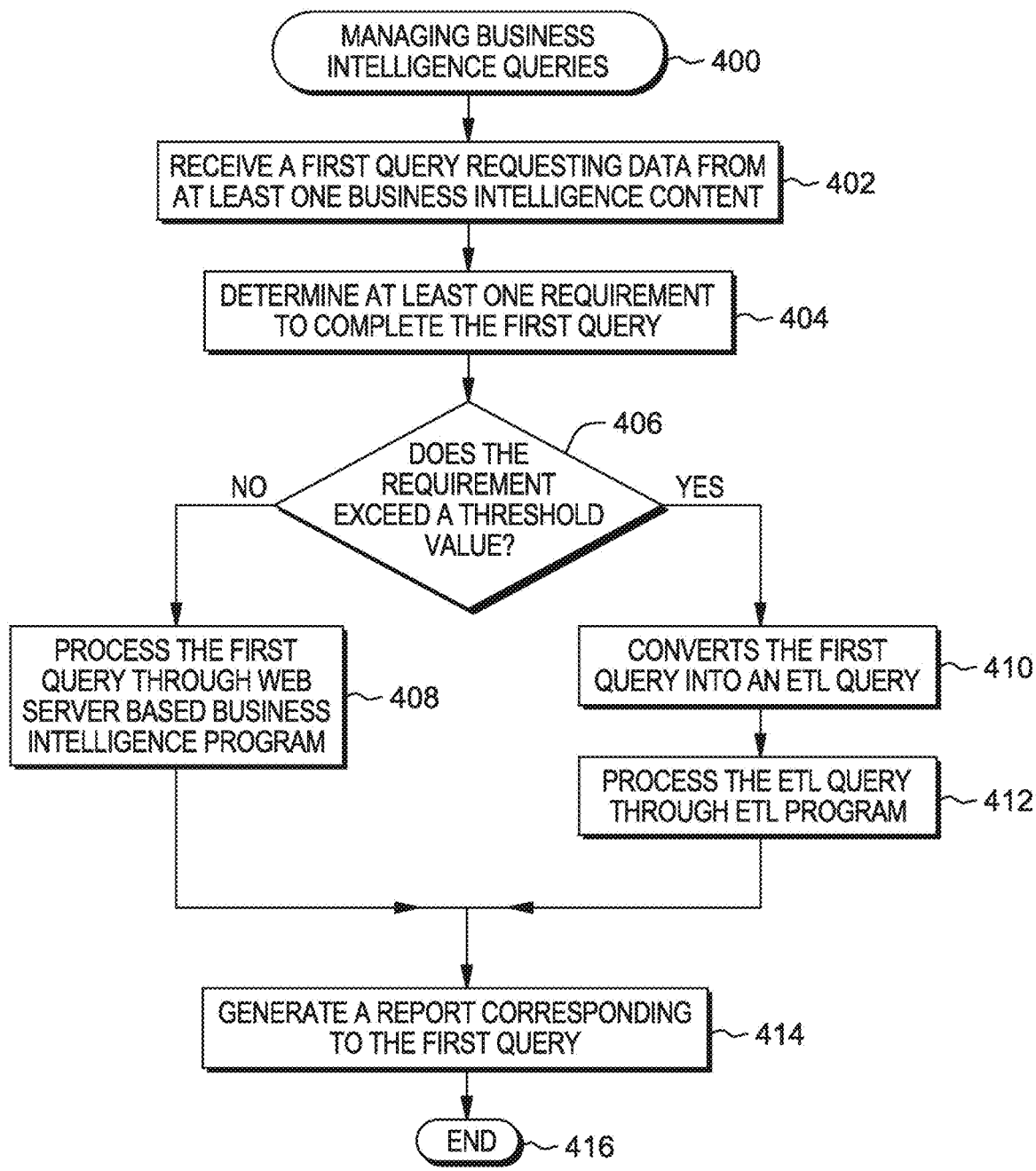
FIG. 4 depicts a flowchart of a process of managing business intelligence queries in accordance with embodiments of the present invention.

FIG. 4 is a flowchart of a process of managing business intelligence queries, where the process is implemented in the environment of FIG. 1 and system of FIG. 2, in accordance with embodiments of the present invention. The process of FIG. 4 begins at step 400. In step 402, query management program 302 (see FIG. 3) receives a first query requesting data from at least one business intelligence content. A query, also known as a report request, is initiated by the end user by logging into a web server, namely web server 304 (see FIG. 3), which provides I/O interface 312 (see FIG. 3) to interact with business intelligence program 306 (see FIG. 3) running on an application server. In one embodiment, business intelligence program 306 (see FIG. 3) is a service oriented application in which the first query can be initiated through a set of URLs, APIs, etc. In one embodiment, step 402 includes query management program 302 receiving request and response messages that are Simple Object Access Protocol ("SOAP") based XML messages. In one embodiment, the first query includes a plurality of parameters such as name and location of the data, values for various prompts in the data that can be used to filter data. In one embodiment, the user, via display coupled to I/O interface 312 (see FIG. 3), may manipulate the parameters in the first query requesting data from at least one business intelligence content.

In one embodiment, step 402 includes query management program 302 (see FIG. 3) receiving a selection of sample reports from the user and creates the first query, where each of the sample reports includes a plurality of parameters. In this embodiment, business intelligence program 306 (see FIG. 3) generates a plurality of the sample reports and allows the user to make the selection. Thereafter, business intelligence program 306 (see FIG. 3) provides query management program 302 (see FIG. 3) with the selected sample reports in which the first query is generated.

In an alternate embodiment, step 402 includes query management program 302 (see FIG. 3) receiving a sample report created by the user, then creating the first query. In this alternate embodiment, query management program 302 (see FIG. 3), after receiving the sample report created by the user, determines whether the sample report includes valid parameters. In one embodiment, query management program 302 (see FIG. 3) restricts, prior to receiving the sample report created by the user, at least one value range from the sample report in order to determine the valid parameters. In particular, query management program 302 (see FIG. 3) identifies parameters in the sample report that exceed the restricted value range and issues an error. In another embodiment, query management program 302 (see FIG. 3), upon identifying parameters in the sample report that exceed the restricted range, generates the first query based on a range that does not exceed the restricted range.

In step 404, query management program 302 (see FIG. 3) determines at least one requirement to complete the first query. In one embodiment, query management program 302 (see FIG. 3) determines length of time required to complete the first query. In another embodiment, step 404 includes query management program 302 determining size of data required to complete the first query. In yet another embodiment, step 404 includes query management program 302 (see FIG. 3) determining server load required to complete the first query. The embodiments shown in step 404 are described in more detail in the discussion of FIGS. 5-7 herein below.

In step 406, query management program 302 (see FIG. 3) determines whether the at least one requirement exceeds a threshold value. In one embodiment, query management program 302 (see FIG. 3), upon determining that the at least one requirement exceeds the threshold value, generates a redacted report that does not exceed the threshold value and inquires whether the user wants to proceed with step 410 for a report that is fully responsive to the first query.

In step 408, in response to determining that the at least one requirement does not exceed a threshold, query management program 302 (see FIG. 3) processes the first query through web server based business intelligence program, which may be business intelligence program 306 (see FIG. 3).

In step 410, in response to determining that the at least one requirement exceeds a threshold, query management program 302 (see FIG. 3) converts the first query into an ETL query. As used herein, the ETL query refers to a query that is compatible with an ETL program or engine, which may be an example of ETL program 308 (see FIG. 3). In one embodiment, query management program 302 creates a query table in which thresholds for the first query is described in a row or column or both. In one embodiment, the query table includes a set of source information, query strategies, and delivery target information to form a basis on converting the first query to the ETL query. In one embodiment, query management program 302 (see FIG. 3) extracts the source information, the query strategy, and the delivery target information from the first query or from past queries having a degree of similarity to the first query. By using the source information, the query strategy, and the delivery target information, query management program 302 (see FIG. 3) converts the first query into the ETL query. The embodiments shown in step 410 are described in more detail in the discussion of FIG. 8 herein below.

In step 412, subsequent to generating the ETL query from the first query, query management program 302 (see FIG. 3) outputs the ETL query to ETL program 308 (see FIG. 3). ETL program 308 (see FIG. 3), upon receiving the ETL query, converts the ETL query into data feed required to generate a report based on the source information, the query strategy, and the delivery target information.

In step 414, a report corresponding to the first query is generated. In one embodiment, ETL program 308 (see FIG. 3) transmits data feed required to generate the report to big data platform 310, and big data platform 308 (see FIG. 3) subsequently generates the report corresponding to the first query. In another embodiment, big data platform 308 receives the data teed from ETL program 308 (see FIG. 3), generates the report, and transmits the report to local server in proximity to an IP address from which the first query was generated. In one embodiment, big data platform 308 (see FIG. 3) uses a content delivery network ("CDN") to facilitate transmitting the report to the local server. In an alternate embodiment, query management program 302 determines how and where the report should be transmitted based on the delivery target information in the query table created in step 410. In this alternate embodiment, big data platform 308 (see FIG. 3) generates the report and transmits the report according to the delivery target information. In step 416, query management program 302 terminates the process of managing business intelligence queries.

Figure 5:
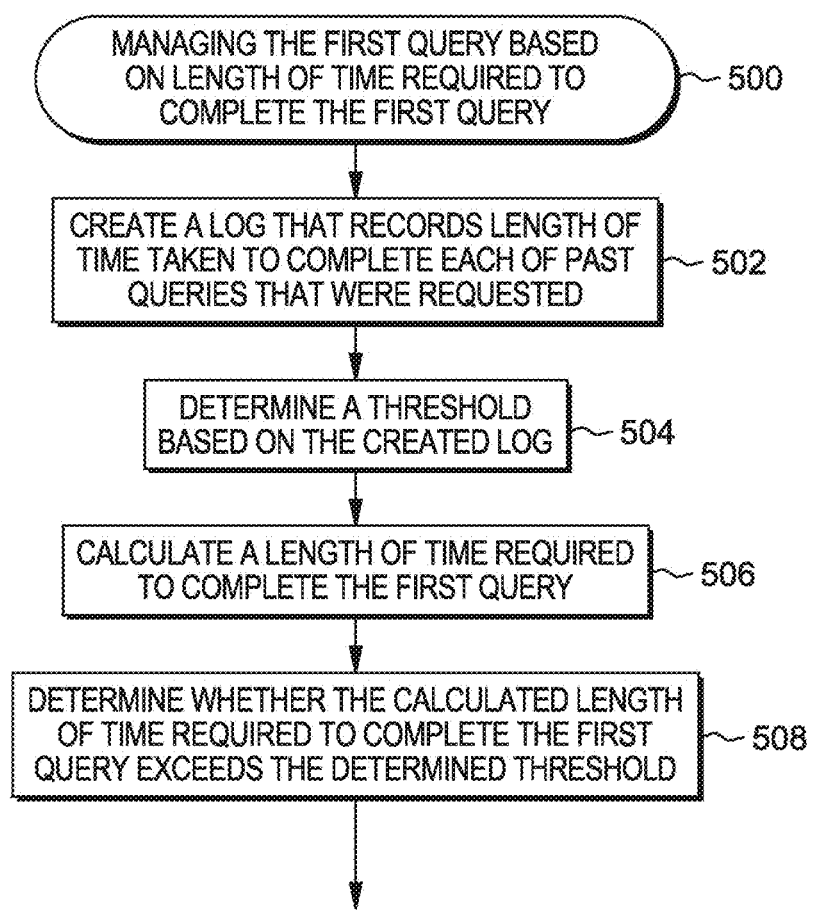
FIG. 5 depicts a flowchart of a process of managing a business intelligence query based on length of time required to complete the query in accordance with embodiments of the present invention.

FIG. 5 is a flowchart of a process of managing a business intelligence query based on length of time required to complete the query, where the process is implemented in the environment of FIG. 1 and system of FIG. 2, in accordance with embodiments of the present invention. The process of FIG. 5 begins at step 500. In step 502, query management program 302 (see FIG. 3) creates a log that records length of time taken to complete each of past queries that were requested through business intelligence program 306. In step 504, query management program 302 (see FIG. 3) determines a threshold based on the created log. In one embodiment, query management program 302 (see FIG. 3) uses the created logs to retrieve past queries having a degree of similarity to the first query and determines a threshold value based, at least in part, on times taken to complete each of the retrieved past queries. In one embodiment, query management program 302 (see FIG. 3) determines the threshold value based on average value of times taken to complete each of the retrieved past queries. In an alternate embodiment, query management program 302 (see FIG. 3) determines the threshold value based on median value of times taken to complete each of the retrieved past queries. In step 506, query management program 302 (see FIG. 3) calculates a length of time required to complete the first query. In step 508, query management program 302 (see FIG. 3) determines whether the calculated length of time required to complete the first query exceed the determined threshold.

Figure 6:
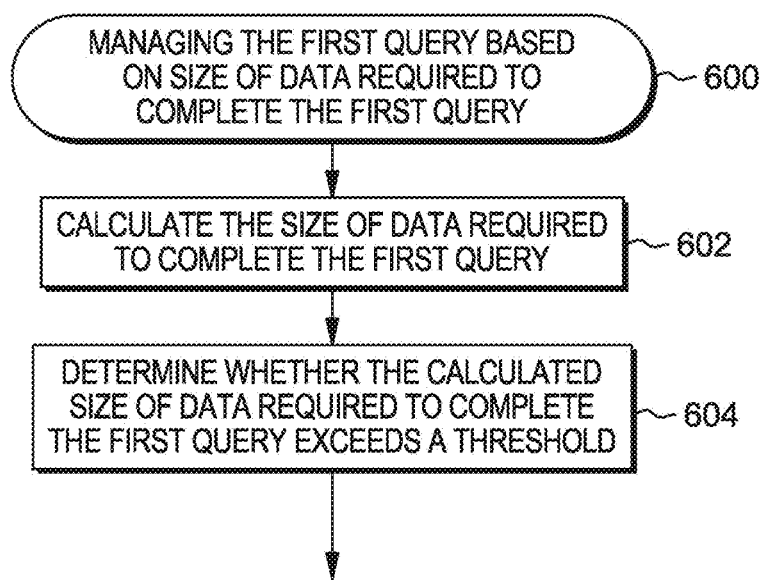
FIG. 6 depicts a flowchart of a process of managing a business intelligence query based on size of data required to complete the query in accordance with embodiments of the present invention.

FIG. 6 is a flowchart of a process of managing a business intelligence query based on size of data required to complete the query, where the process is implemented in the environment of FIG. 1 and system of FIG. 2, in accordance with embodiments of the present invention. The process of FIG. 6 begins at step 600. In step 602, query management program 302 (see FIG. 3) calculates the size of data required to complete the first query. For each query, query management program 302 (see FIG. 3) determines the size of data based on parameters implicitly or explicitly expressed in the first query. In one embodiment, query management program 302 (see FIG. 3) estimates the size of data based on the date range parameter requested by the first query. For instance, if the first query is requesting business intelligence data for the past three years, query management program 302 (see FIG. 3) estimates the size of data based on the "past three years" parameter. In step 604, query management program 302 (see FIG. 3) determines whether the calculated size of data required to complete the first query exceeds a threshold. In order to determine the threshold value when using the size of data as the requirement, query management program 302 (see FIG. 3) receives an input from the user via I/O interface 312. In another embodiment, query management program 302 (see FIG. 3) determines the threshold value based on network traffic of web server 304 or usage of business intelligence program 306 (see FIG. 3) or both, where multiple client devices, which may be an example of clients 110, 112, and 114, may be simultaneously using business intelligence program 306 while query management program 302 determines the threshold value.

Figure 7:
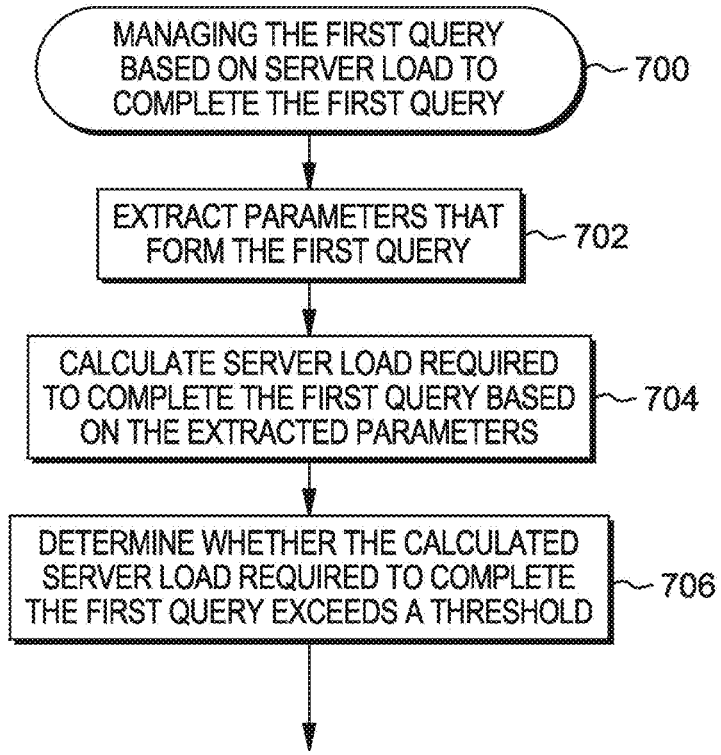
FIG. 7 is a flowchart of a process of managing a business intelligence query based on server load required to complete the query in accordance with embodiments of the present invention.

FIG. 7 is a flowchart of a process of managing a business intelligence query based on server load required to complete the query, where the process is implemented in the environment of FIG. 1 and system of FIG. 2, in accordance with embodiments of the present invention. The process of FIG. 7 begins at step 700. In step 702, query management program 302 (see FIG. 3) extracts parameters that form the first query. In one embodiment, query management program 302 (see FIG. 3) extracts parameters including specification of peak times, volume of data, number of columns, network bandwidth and usage, etc. In step 704, query management program 302 (see FIG. 3) calculates server load required to complete the first query based on the extracted parameters. In step 706, query management program 302 (see FIG. 3) determines whether the calculated server load required to complete the first query exceeds the threshold value. In one embodiment, query management program 302 (see FIG. 3) compares the server load required to complete the query with server timeout values as the threshold. As used herein, timeout value is a network parameter related to an enforced event designed to occur at the conclusion of a predetermined elapsed time.

Figure 8:
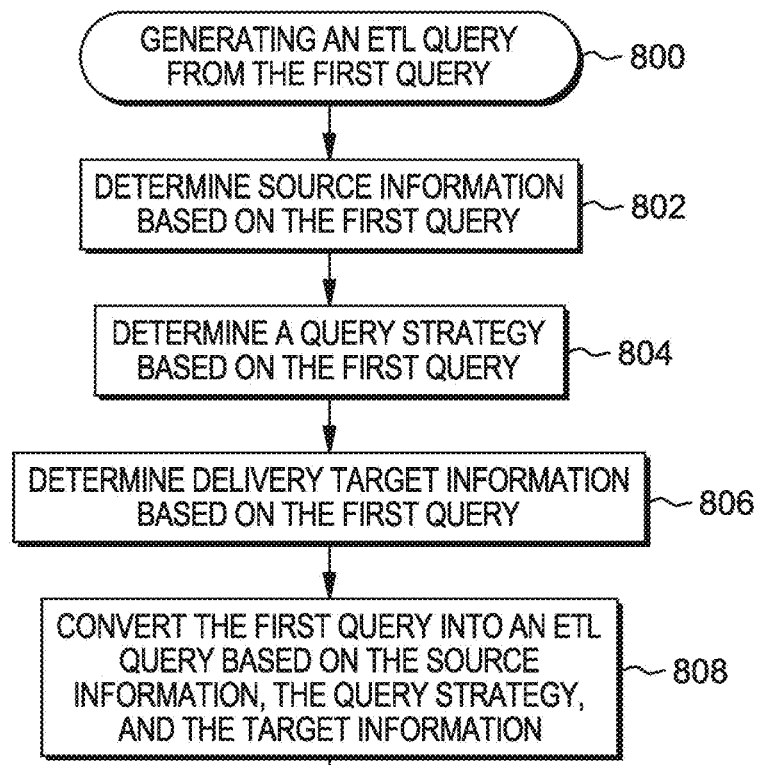
FIG. 8 is a flowchart of a process of generating an ETL query from a business intelligence query in accordance with embodiments of the present invention.

FIG. 8 is a flowchart of a process of generating an ETL query from e first query, where the process is implemented in the environment of FIG. 1 and system of FIG. 2, in accordance with embodiments of the present invention. The process of FIG. 8 begins at step 800. In step 802, query management program 302 (see FIG. 3) determines source information based on the first query. As used herein, source information refers to a type or source of data in which ETL program 308 (see FIG. 3) is required to retrieve. In one embodiment, source information refers to accessing at least one business intelligence database, such as online transaction processing ("OLTP") database and online analytical processing ("OLAP") database. In an alternative embodiment, source information refers to accessing databases including relational databases (e.g., XML databases, NewSQL) and non-relational databases (e.g., NoSQL).

In step 804, query management program 302 (see FIG. 3) determines a query strategy based on the first query. In one embodiment, the query strategy includes instructions to access specific columns and corresponding data types in order to complete the first query. For example, the first query may request five columns of data in which each column may include a unique data type, e.g., string, characters, double, or long. In response, query management program 302 (see FIG. 3) determines the query strategy by providing instructions to retrieve the five columns from a source database. In one embodiment, query management program 302 (see FIG. 3) determines the query strategy by identifying a set of parameters required to process specific columns and corresponding data types in order to complete the first query. In one embodiment, the query strategy includes a set of database queries are compatible the source database. In one embodiment, the query strategy includes a set of database queries that are compatible with a server or a system e.g., big data program 310 (see FIG. 3), to which the data feed will be delivered. In one embodiment, the query strategy includes instructions to process the ETL query by means of parallel processing, including data parallel processing, pipeline processing, and component processing. In one embodiment, the query strategy includes instructions for the report to conform to a specific format (e.g., graphs, charts, text).

In step 806, query management program 302 (see FIG. 3) determines delivery target information based on the first query. As used herein, delivery target information describes a location at which the data feed will be processed. A location may include local server in proximity to an IP address from which the first query was generated or big data platform 310 (see FIG. 3) or both. In one embodiment, query management program 302 (see FIG. 3) determines the delivery target information based on at least one of the following: available bandwidth, distance from the location from which the first query was generated, and whether the generated report needs to be streamed into the user interface, namely I/O interface 312 (see FIG. 3).

In step 808, query management program 302 (see FIG. 3) converts the first query into an ETL query based on the source information, the query strategy, and the target information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing queries in business intelligence platforms, said method comprising:
   determining, by one or more processors, that at least one requirement to complete a first query exceeds a threshold and in response, generating, by the one or more processors, a redacted report failing to exceed the threshold, said first query requesting data from at least one business intelligence content from a first geographical region;
   in response to detecting a rejection, by a user, of the redacted report after the user had been prompted, by the one or more processors, to accept or reject the redacted report:
      converting, by the one or more processors, the first query to a second query configured to be used by an Extract, Transform, and Load (ETL) program from a second geographical region; and
      generating, by the one or more processors, a report responsive to the first query.

2. The method of claim 1, wherein said converting the first ery to the second query further comprises:
   determining, by the one or more processors, source information based on the first query;
   determining, by the one or more processors, a query strategy based on the first query;
   determining, by the one or more processors, delivery target information based on the first query; and
   converting, by the one or more processors, the first query into the second query based on the source information, the query strategy, and the target information.

3. The method of claim 1, wherein the at least one requirement comprises length of time required to complete the first query.

4. The method of claim 3, said method further comprising:
   creating, by the one or more processors, a log that records length of time taken to complete each of past queries requesting data from the at least one business intelligence content;
   determining, by the one or more processors, the threshold based on the created log;
   calculating, by the one or more processors, the length of time required to complete the first query; and
   determining, by the one or more processors, whether the length of time required to complete the first query exceeds the threshold.

5. The method of claim 1, wherein the at least one requirement comprises size of data requested by the first query.

6. The method of claim 5, said method further comprising:
   calculating, by the one or more processors, the size of data required to complete the first query; and
   determining, by the one or more processors, whether the calculated size of data required to complete the first query exceeds the threshold.

7. The method of claim 1, wherein the at least one requirement comprises server load required to complete the first query.

8. The method of claim 7, said method further comprising:
   extracting, by the one or more processors, parameters that form the first query;
   calculating, by the one or more processors, the server load required to complete the first query based on the extracted parameters; and
   determining, by the one or more processors, whether the server load required to complete the first query exceeds the threshold.

9. The method of claim 1, said method further comprising:
   converting, by the one or more processors, the second query to a third query configured to be used by a big data platform, the third query having a third format.

10. A computer program product, comprising one or more computer-readable hardware storage devices having computer-readable program code stored therein, said computer-readable program code containing instructions executable by one or more processors of a computer system to implement a method for managing queries in business intelligence platforms, said method comprising:
    determining, by the one or more processors, that at least one requirement to complete a first query exceeds a threshold and in response, generating, by the one or more processors, a redacted report failing to exceed the threshold, said first query requesting data from at least one business intelligence content from a first geographical region;
    in response to detecting a rejection, by a user, of the redacted report after the user had been prompted, by the one or more processors, to accept or reject the redacted report:
       converting, by the one or more processors, the first query to a second query configured to be used by an Extract, Transform, and Load (ETL) program from a second geographical region; and
       generating, by the one or more processors, a report responsive to the first query.

11. The computer program product of claim 10, wherein said converting the first query to the second query further comprises:
    determining, by the one or more processors, source information based on the first query;

determining, by the one or more processors, a query strategy based on the first query;

determining, by the one or more processors, delivery target information based on the first query; and converting, by the one or more processors, the first query into the second query based on the source information, the query strategy, and the target information.

12. The computer program product of claim 10, wherein the at least one requirement comprises length of time required to complete the first query.

13. The computer program product of claim 12, said method further comprising:

creating, by the one or more processors, a log that records length of time taken to complete each of past queries requesting data from the at least one business intelligence content;

determining, by the one or more processors, the threshold based on the created log;

calculating, by the one or more processors, the length of time required to complete the first query; and determining, by the one or more processors, whether the length of time required to complete the first query exceeds the threshold.

14. The computer program product of claim 10, wherein the at least one requirement comprises size of data requested by the first query.

15. The computer program product of claim 14, said method further comprising:

calculating, by the one or more processors, the size of data required to complete the first query; and determining, by the one or more processors, whether the calculated size of data required to complete the first query exceeds the threshold.

16. A compute comprising one or more processors, one or more memories, and one or more computer-readable hardware storage devices, said one or more computer-readable hardware storage devices containing program code executable by the one or more processors via the one or more memories to implement a method for managing queries in business intelligence platforms, said method comprising:

determining, by one or more processors, that at least one requirement to complete a first query exceeds a threshold and in response, generating, by the one or more processors, a redacted report failing to exceed the threshold, said first query requesting data from at least one business intelligence content from a first geographical region;

in response to detecting a rejection, by a user, of the redacted report after the user had been prompted, by the one or more processors, to accept or reject the redacted report:

converting, by the one or more processors, the first query to a second query configured to be used by an Extract, Transform, and Load (ETL) program from a second geographical region; and generating, by the one or more processors, a report responsive to the first query.

17. The computer system of claim 16, wherein said converting the first query to the second query further comprises:

determining, by the one or more processors, source information based on the first query;

determining, by the one or more processors, a query strategy based on the first query;

determining, by the one or more processors, delivery target information based on the first query; and converting, by the one or more processors, the first query into the second query based on the source information, the query strategy, and the target information.

18. The computer system of claim 16, wherein the at least one requirement comprises length of time required to complete the first query.

19. The computer system of claim 18, said method further comprising:

creating, by the one or more processors, a log that records length of time taken to complete each of past queries requesting data from the at least one business intelligence content;

determining, by the one or more processors, the threshold based on the created log;

calculating, by the one or more processors, the length of time required to complete the first query; and determining, by the one or more processors, whether the length of time required to complete the first query exceeds the threshold.

20. The computer system of claim 16, wherein the at least one requirement comprises size of data requested by the first query.

* * * * *